United States Patent

[11] 3,580,211

| [72] | Inventors | Hajime Kurashiki<br>Tokyo;<br>Yoshiharu Ikuta, Ichihara, Chiba, Japan |
|---|---|---|
| [21] | Appl. No. | 842,250 |
| [22] | Filed | July 16, 1969 |
| [45] | Patented | May 25, 1971 |
| [73] | Assignee | Mitsui Shipbuilding and Engineering Co. Ltd.<br>Tokyo, Japan |
| [32] | Priority | July 18, 1968 |
| [33] | | Japan |
| [31] | | 43/50996 |

[54] METHOD OF SHAFT ALIGNMENT OF A MAIN ENGINE SHAFT IN SHIPBUILDING
1 Claim, 3 Drawing Figs.

[52] U.S. Cl. .................................................... 115/0.5,
29/407, 29/464, 33/46.2
[51] Int. Cl. ........................................................ B63b 11/06

[50] Field of Search .............................................. 115/0.5, 34;
29/407, 464; 33/46.2

[56] References Cited
OTHER REFERENCES
American Machinist Aug. 15, 1955 Page 117 American Machinist May 21, 1956 Page 152

*Primary Examiner*—Andrew H. Farrell
*Attorney*—Howson and Howson

ABSTRACT: A method of aligning the shaft of a main engine with the centerline of the propeller shaft in which the main bearing pins of the crankshaft are made hollow to permit sighting through the crankshaft and the bearings for alignment of all of the elements. The elements are aligned approximately by threading a piano wire through the elements and are more precisely adjusted by visual alignment after removal of the wire.

Patented May 25, 1971
3,580,211
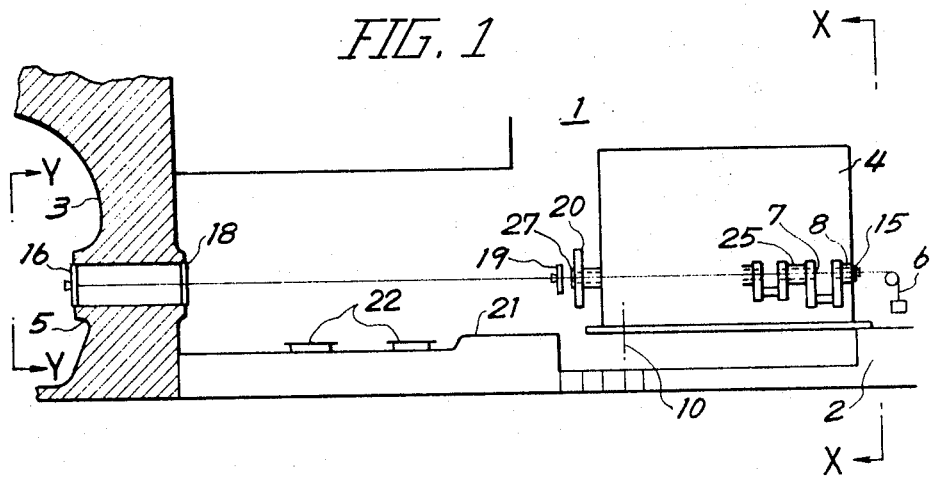
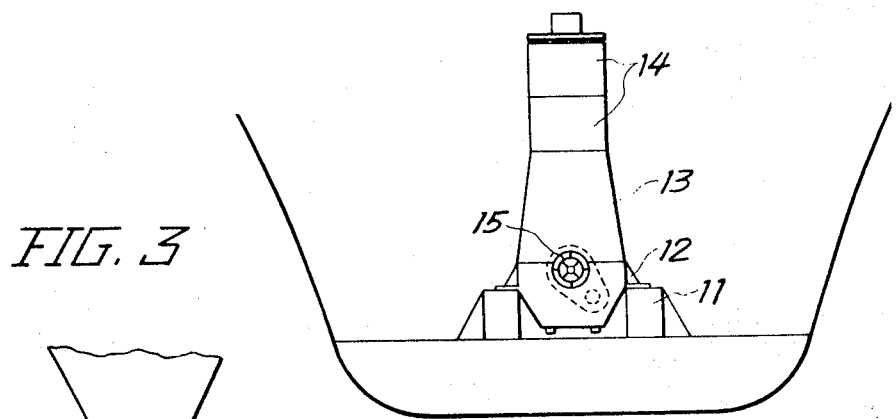
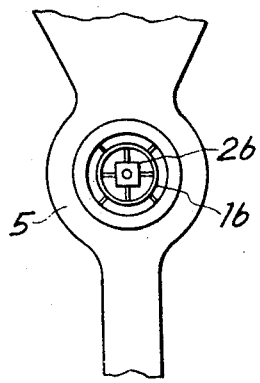
INVENTORS:
HAJIME KURASHIKI
YOSHIHARU IKUTA
BY Howson & Howson
ATTYS.

METHOD OF SHAFT ALIGNMENT OF A MAIN ENGINE SHAFT IN SHIPBUILDING

This invention relates to a method of shaft alignment of a main engine shaft in shipbuilding.

Heretofore, the sighting for shaft alignment of the main shaft of the main engine has been performed after completion of the stern construction and before installation of the main engine.

More particularly, after the bore of the stern frame has been finished, the propeller shaft is inserted into the bore, and position for setting the main engine is then determined and the main engine is mounted thereon. Furthermore, position of the engine is adjusted for installation.

In accordance with the conventional method, the main engine can not be mounted for a long term until the stern construction is completed. Therefore, it is impossible to construct the block over the main engine room, such as a living quarter, and equipment such as a funnel, during the term. This causes delay in beginning of the confirmation trial and mooring trial of the main engine. Thus the building period is extended and the operational rate of the dock will decrease.

It is an object of this invention to provide a method whereby the block and equipments over the main engine room can be constructed at the same time with the main engine installation to shorten the building period.

In accordance with this invention, the main shaft of the main engine is bored coaxially with the center of the shaft before installation, the engine is installed before the stern construction being completed, and the alignment of the main shaft and stern bore is performed by sighting through the bore of the shaft. In other words, the main bearing pins of the crankshaft are made hollow to permit sighting through the crankshaft and bearings for alignment of all elements with the centerline of the propeller shaft.

In the drawings;

FIG. 1 is a sectional view of the stern portion in order to explain the method in accordance with this invention;

FIG. 2 is a sectional view taken on line X-X in FIG. 1; and

FIG. 3 is a sectional view taken on line Y-Y in FIG. 1.

Referring to the drawings, a crank shaft of a main engine 4 is previously bored in coaxial relation with the center of the shaft. After a bottom construction 2 of a main engine room 1 has been mounted, positions of bolt holes for installing the main engine are marked to a main engine bed 11 by taking the dimensions of each part from a standard frame 10 according to shafting drawings. Thereafter a base plate 12, main engine column 13 and cylinder block 14 are respectively mounted at the determined position. An intermediate shaft, intermediate shaft bearing, propeller shaft and thrust bearing are laid along the shaft line so as not to obstruct the sighting through the center bore of the crankshaft. The crankshaft of the main engine is rotated to the angular position where sighting is not intercepted by each connecting rod of the engine.

Thereafter a forward sight plate 15 is provided on a forward end of the center bore of a No. 1 main journal 8. When it is impossible to sight from the forward end through the center bore, a sight plate 7 is provided on a forward end of the No. 2 main journal 25. The center of the sight plate 15 is positioned in the central portion of the ship body by adjusting the position of the main engine taking the dimensions of lengths from the bottom keel and both side shell platings and adjusting the verticality in accordance with the shafting drawings.

A rear sight plate 16 is provided on the rear end surface of the boss 5 of the stern frame 3. Each sight plate comprises an adjustable plate 26 having a sighting hole as shown in FIG. 3. Intermediate sight plates 18 and 19 are of same structure with the above sight plate, the sight plate 19 is provided on the ship body near the flywheel 20 at the rear end of the crankshaft and the sight plate 18 is provided on the forward end of the stern frame boss 5. After which a piano wire 6 is stretched between the sight plates 15 and 16, and the sight plates 18 and 19 are adjusted so that the piano wire 6 may pass through the center of each hole of the sight plates. The heights of a thrust bearing seat 21 and intermediate shaft bearing seats 22 and centerline of these seats are measured and marked thereon.

Thereafter the piano wire 6 is removed and a source of light of 300 w. is placed out of the rear sight plate 16. By sighting the source of light from the forward sight plate 15, the sight plates 18 and 19 are more precisely adjusted. A sight plate 27 is fixed to the rear end of the crankshaft and the main engine is finely adjusted by sighting the sight plate 27. Further the center of the stern frame boss 5 is determined and marked, thereby the hole of the boss is bored.

This invention may be also applicable to install the other type of engine such as a steam turbine engine.

Advantages in accordance with this invention are as follows:

1. When the bottom construction is completed, the main engine can be mounted before the stern frame and other construction are completed. Thus the mounting work of the main engine is easily and safely performed without meeting any obstruction by other blocks.
2. After mounting of the main engine, the block and equipments over the main engine room can be constructed at the same time as sighting of the main shaft line or before the sighting.
3. Since the main engine and the working scaffold, such as a gangway and a foot grating, in the main engine room can be provided early in the working stage in the engine room and the working around the main engine is performed easily and efficiently.
4. Heretofore, shaft line sighting and the shaft line alignment are performed before installation of the main engine. Therefore, when the engine is installed, the determined position of the shaft line may be moved due to heat distortion of the hull by the sun's radiation. Further the bed member is deflected by mass of the main engine when installed, thus it is necessary to make a serious adjustment.

The method by this invention eliminates such errors, because the sighting and the shaft line alignment is taken after installation of the main engine.

5. In conventional two-part hull construction procedures, there has been need to dock into both the joining dock and the final dock. In accordance with this invention, the stern frame and the equipment of the main engine room can be built at an early stage. Accordingly, the ship can be virtually completed in the dock for joining the fore and aft section of the ship, that is there is no need of docking in two times. Thus the docks are efficiently used and the building period can be shortened.

We claim:

1. A method of shaft alignment of a main engine shaft in shipbuilding comprising the steps of boring the main engine shaft along the center of the shaft, installing a main engine after a bottom construction has been completed and before a stern frame and an upper portion of the engine room has been built, sighting the shaft line of the main engine through the bore of the main engine shaft and aligning the shaft line with the centerline of the propeller shaft.